United States Patent [19]

Wentworth, Jr.

[11] 4,114,904
[45] Sep. 19, 1978

[54] BELLOWS-TYPE MECHANICAL SEAL

[75] Inventor: Robert S. Wentworth, Jr., Temecula, Calif.

[73] Assignee: Borg-Warner Corporation, Chicago, Ill.

[21] Appl. No.: 839,475

[22] Filed: Oct. 4, 1977

[51] Int. Cl.² ............................................. F16J 15/36
[52] U.S. Cl. ...................................... 277/88; 277/126; 277/188 R; 85/32 V
[58] Field of Search ..................................... 277/88–90, 277/126, 189, 188 R, 101, 166; 85/32 V

[56] References Cited

U.S. PATENT DOCUMENTS

| | | | |
|---|---|---|---|
| 2,237,494 | 4/1941 | McCormack | 277/88 X |
| 2,296,724 | 9/1942 | McCormack | 277/88 X |
| 3,479,040 | 11/1969 | Tracy | 277/88 X |
| 3,776,560 | 12/1973 | Wentworth | 277/88 |

FOREIGN PATENT DOCUMENTS 221,253  5/1962  Austria ..................................... 85/32 V Primary Examiner—Robert S. Ward, Jr.
Attorney, Agent, or Firm—Aubrey L. Burgess

[57] ABSTRACT

A system for clamping a bellows assembly of a mechanical seal to its flange in the minimum radial and axial space which comprises the use of set screws, the threads of which are received in openings defined in part by a body flange and in part by a bellows support ring. The portion in the support ring is threaded while the remainder is not threaded. The threads in the threaded opening portion may match those of the set screw, i.e., helical, or may be merely parallel, i.e. not helical. In the latter, the arc of contact between the threads is relatively small.

7 Claims, 5 Drawing Figures

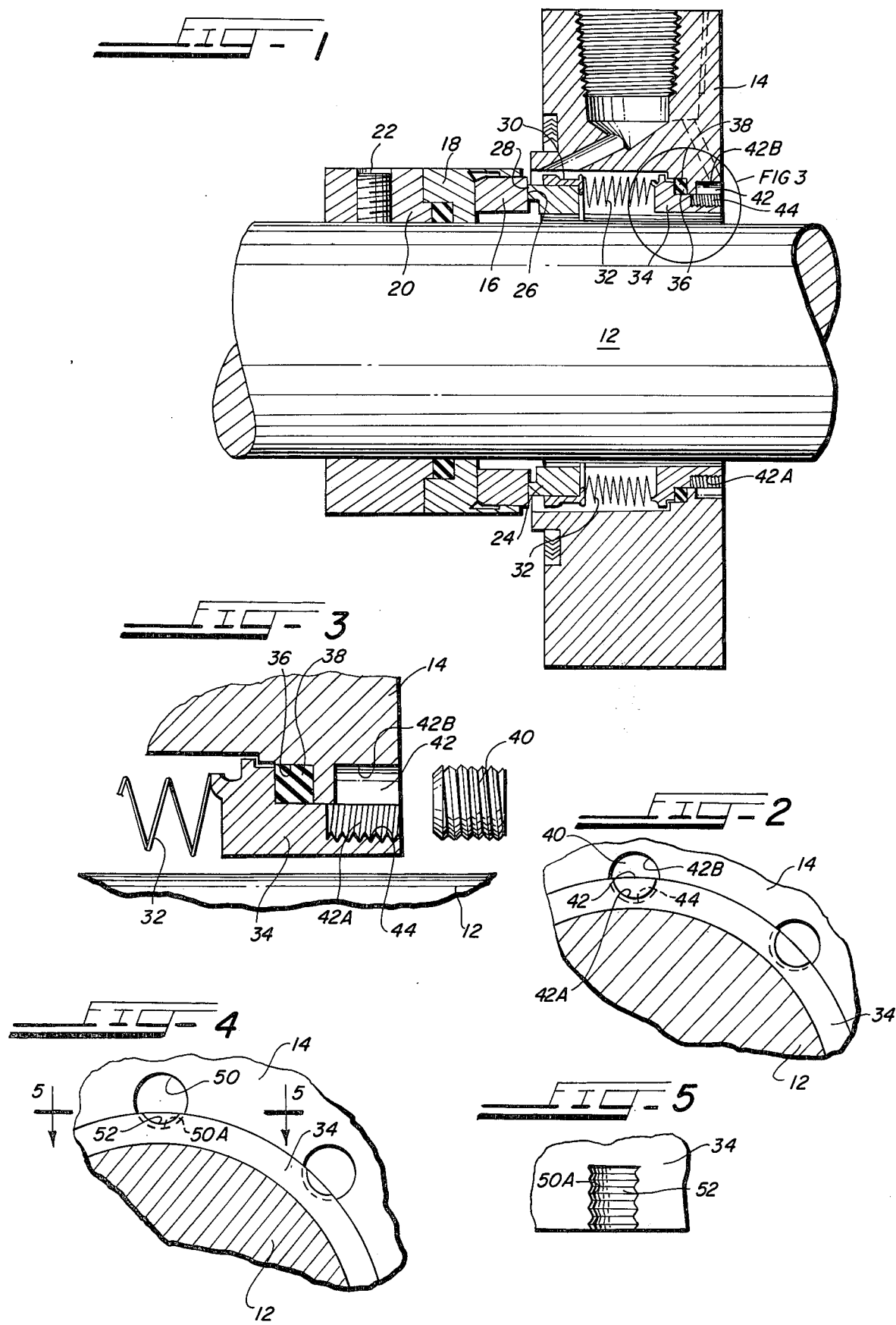

BELLOWS-TYPE MECHANICAL SEAL

BACKGROUND OF THE INVENTION

Bellows-type mechanical seals are well known in the art. In the conventional seal of this type, the bellows is welded to a support ring which is surrounded by a housing flange. A gasket is positioned in a suitable cavity and the bellows ring is pulled against the flange, thus perfecting the gasket seal between the flange and the ring. Usually one or more set screws are used to pull the ring toward the flange, the set screws being received in openings in the ring bearing against the flange.

THE INVENTION

In accordance with the invention to be described herein, a bellows-type mechanical seal utilizes a set screw to pull the bellows support ring toward the housing flange to perfect the gasket seal between the ring and the flange. However, the screw opening is partially in the support ring and partially in the body flange, and only the portion of the openings for the set screws in the support ring are threaded. Costly manufacturing steps are eliminated; also manufacturing can be facilitated by using milled parallel threads in the ring set screw opening portion in lieu of the usual machined helical threads. In this alternative construction, the area of contact of the set screw threads and milled parallel threads is generally less than the convention substantially full depth contact between helical threads and the set screw threads.

THE DRAWINGS

FIG. 1 is a partial sectional view of a bellows-type mechanical seal utilizing this invention and taken on line 1 of FIG. 2;

FIG. 2 is a partial elevational view of the structure of FIG. 1;

FIG. 3 is an enlarged partial sectional view similar to FIG. 1 showing details of the invention;

FIG. 4 is a view similar to FIG. 2 showing a second embodiment of the invention; and FIG. 5 is a partial sectional view taken on line 5—5 of FIG. 4 illustrating a detail of the second embodiment.

DETAILED DESCRIPTION

Referring now to the drawings, and especially FIGS. 1 to 3, there is illustrated a bellows-type mechanical seal assembly 10 associated with a shaft 12 and a housing flange 14. The seal assembly comprises a rotary seal ring 16 supported by a back-up ring 18 axially positioned and fixed to the shaft 10 by a ring collar 20 and a set screw 22, and a stationary seal ring 24, the seal ring 16 having a radially disposed face 26 engaging a radially disposed face 28 of the ring 24. The ring 24 is surrounded by and connected to a metal ferrule 30 to which is welded a bellows 32 constructed, for example, of metal annulii welded together. The actual construction of the bellows is incidental to the invention herein. The bellows 32 is welded, at its opposite end, to a lip of a bellows support ring 34 surrounding the shaft 12. The support ring 34 and the housing flange 14 define a cavity 36 to receive a gasket 38.

When the support ring 34 is drawn toward the flange 14, the gasket 38 provides a fluid tight seal between the flange and the ring. To draw the ring 34 toward the flange 14, a plurality of helically-threaded set screws 40 are used, each being received in an opening 42 defined in part (42A) in the support ring 34 and in part (42B) in the flange 14. The openings 42 are generally equally spaced around the assembly. To facilitate the manufacture of the assembly, only the opening portions 42A in the support ring need be threaded — the threads 44 matching those of the screws 40. The set screws 40 are shorter than the depth of the openings 42 and bear against the flange 14, so that when driven inwardly, they cause the support ring 34 to move (to the right as viewed in the drawings) and compress the gasket 38.

An alternative arrangement is illustrated in FIGS. 4 and 5. Here the openings defined in part by the support ring 34 and the body flange 14 are identified as 50, the parts being identified as 50A (support ring) and 50B (body flange). The threads 52 in the part 50A are parallel threads, as particularly shown in FIG. 4 and do not match the helical threads of the set screws 40. In this embodiment, the opening part 50A is of smaller size than the opening part 50B; thus the arc of contact between the threads of the screws 40 and the threads 52 is relatively small. Thus the depth of the support ring opening 50A is less than the radius of the set screws 40. The operation of this alternative arrangement is the same as the earlier described embodiment.

What is claimed is:

1. In a bellows-type mechanical seal assembly comprising a bellows supported by a support ring axially movable with respect to a housing flange and being sealed thereto by a gasket with means to axially move the support ring relative to the housing flange to compress the gasket, the improvement which comprises:

a threaded set screw for bearing against a portion of said housing flange and received in a substantially circular opening partially in said support ring and partially in said housing flange, one of said partial openings being threaded to be engaged by the threads of said set screw and the other of said partial openings being free of threads to constrain radial movement of said set screw.

2. In a bellows-type mechanical seal assembly comprising a bellows supported by a support ring axially movable with respect to a housing flange and being sealed thereto by a gasket with means to axially move the support ring relative to the housing flange to compress the gasket, the improvement which comprises:

a threaded set screw for bearing against a portion of said housing flange and received in a substantially circular opening partially in said support ring and partially in said housing flange, said opening in said support ring having threads engaged by the threads on said set screw, said opening in said housing flange being free of threads while constraining substantial radial movement of said set screw.

3. In a bellows-type mechanical seal as recited in claim 2, in which said support ring and said housing flange each has a substantially semi-circular opening comprising said substantially circular opening.

4. In a bellows-type mechanical seal as recited in claim 3, the improvement further comprising helical threads on said set screw and substantially matching helical threads in said support ring opening.

5. In a bellows-type mechanical seal as recited in claim 3, the improvement further comprising helical threads on said set screw and parallel, non-helical threads in said support ring opening.

6. In a bellows-type mechanical seal as recited in claim 3, the improvement further comprising said set screw having a larger radius than the depth of the support ring opening.

7. Apparatus comprising a first member having a flange and a second member having a flange, said flanges defining a cavity, a gasket in said cavity, and means to move said members relative to one another to perfect a gasket seal therebetween, said means comprising a helically threaed set screw received in an opening a part of which is in one of said members and is unthreaded and the other part of which is in the other of said members and is parallel threaded, the arc of contact of said screw and said other of said members being less than one half the circumference of said screw.

* * * * *